(12) United States Patent
Sidenmark et al.

(10) Patent No.: US 9,068,551 B2
(45) Date of Patent: Jun. 30, 2015

(54) WAVE ENERGY CONVERTER

(75) Inventors: Mikael Sidenmark, Karlskrona (SE); Torbjörn Andersson, Karlskrona (SE)

(73) Assignee: OCEAN HARVESTING TECHNOLOGIES AB, Karlskrona (SE)

( * ) Notice: Subject to any disclaimer, the term of this patent is extended or adjusted under 35 U.S.C. 154(b) by 4 days.

(21) Appl. No.: 14/123,346

(22) PCT Filed: Jun. 4, 2012

(86) PCT No.: PCT/SE2012/050594
§ 371 (c)(1),
(2), (4) Date: Feb. 11, 2014

(87) PCT Pub. No.: WO2012/166047
PCT Pub. Date: Dec. 6, 2012

(65) Prior Publication Data
US 2014/0152015 A1    Jun. 5, 2014

(30) Foreign Application Priority Data
Jun. 3, 2011    (SE) .................................. 1100436

(51) Int. Cl.
*F03B 13/10*    (2006.01)
*F03B 13/12*    (2006.01)
(Continued)

(52) U.S. Cl.
CPC ............. *F03B 13/18* (2013.01); *F03B 13/1885* (2013.01); *F03B 13/20* (2013.01); *F05B 2260/406* (2013.01); *Y02E 10/38* (2013.01); *E02B 9/08* (2013.01); *F03G 3/00* (2013.01)

(58) Field of Classification Search
USPC ............ 290/42, 53; 405/76; 60/490–499, 507
See application file for complete search history.

(56) References Cited

U.S. PATENT DOCUMENTS 1,292,223 A    1/1919    Anell
3,567,953 A    3/1971    Lord
(Continued)

FOREIGN PATENT DOCUMENTS

FR    2 339 071 A1    8/1977
FR    2 409 396 A1    6/1979
(Continued)

OTHER PUBLICATIONS

International Search Report issued in corresponding International application No. PCT/SE2012/050594, date of mailing Sep. 6, 2012.
(Continued)

Primary Examiner — Pedro J Cuevas
(74) Attorney, Agent, or Firm — Patent Portfolio Builders PLLC

(57) ABSTRACT

A wave energy converter (10) comprises an energy absorption unit (100) arranged to absorb energy generated by movements of water when the wave energy converter is arranged in a pool of water, an energy accumulation unit (200) connected to the energy absorption unit, and a power generation unit (300) connected to the energy absorption unit. The energy accumulation unit is arranged to accumulate energy from the energy absorption unit when the energy absorption unit absorbs more power than the power generation unit generates and to dissipate energy to the power generation unit when the energy absorption unit absorbs less power than the power generation unit generates. By providing hydraulic components in these units, an efficient and flexible wave energy converter is provided.

14 Claims, 4 Drawing Sheets

(51) Int. Cl.
*H02P 9/04* (2006.01)
*F03B 13/18* (2006.01)
*F03B 13/20* (2006.01)
*F03G 3/00* (2006.01)
*E02B 9/08* (2006.01)

(56) References Cited

U.S. PATENT DOCUMENTS

| | | | |
|---|---|---|---|
| 4,145,885 A | 3/1979 | Solell | |
| 4,208,877 A * | 6/1980 | Evans et al. | 60/495 |
| 4,241,579 A | 12/1980 | Borgren | |
| 4,242,593 A | 12/1980 | Quilico et al. | |
| 4,355,511 A * | 10/1982 | Jones | 60/507 |
| 4,742,241 A * | 5/1988 | Melvin | 290/53 |
| 4,883,411 A * | 11/1989 | Windle | 417/331 |
| 5,066,867 A | 11/1991 | Shim | |
| 5,424,582 A | 6/1995 | Trepl et al. | |
| 5,499,889 A * | 3/1996 | Yim | 405/76 |
| 5,889,336 A | 3/1999 | Tateishi | |
| 5,929,531 A * | 7/1999 | Lagno | 290/53 |
| 6,392,314 B1 * | 5/2002 | Dick | 290/53 |
| 6,681,572 B2 * | 1/2004 | Flory | 60/507 |
| 7,045,912 B2 | 5/2006 | Leijon et al. | |
| 7,140,180 B2 * | 11/2006 | Gerber et al. | 60/496 |
| 7,245,041 B1 | 7/2007 | Olson | |
| 7,319,278 B2 | 1/2008 | Gehring | |
| 7,402,028 B2 * | 7/2008 | Wong | 417/328 |
| 7,443,046 B2 * | 10/2008 | Stewart et al. | 290/53 |
| 7,498,685 B2 * | 3/2009 | Turner | 290/53 |
| 7,683,500 B2 | 3/2010 | Greenspan et al. | |
| 7,791,213 B2 | 9/2010 | Patterson | |
| 7,845,880 B2 * | 12/2010 | Rasmussen | 405/76 |
| 8,035,243 B1 * | 10/2011 | Mesa | 290/53 |
| 8,084,877 B1 | 12/2011 | Raisch | |
| 8,093,736 B2 * | 1/2012 | Raftery | 290/42 |
| 8,276,377 B2 | 10/2012 | Patton | |
| 8,319,359 B2 | 11/2012 | Akervoll | |
| 8,397,497 B2 | 3/2013 | Cucurella Ripoli | |
| 8,405,241 B2 | 3/2013 | Chen et al. | |
| 8,421,259 B2 | 4/2013 | Ardoise et al. | |
| 8,441,139 B2 | 5/2013 | Karimi | |
| 8,581,433 B2 * | 11/2013 | Sidenmark | 290/53 |
| 8,671,675 B2 * | 3/2014 | Cuong | 60/498 |
| 8,686,583 B2 * | 4/2014 | Bender | 290/53 |
| 8,866,328 B1 * | 10/2014 | Hench et al. | 290/53 |
| 2006/0273594 A1 | 12/2006 | Gehring | |
| 2007/0164568 A1 | 7/2007 | Greenspan et al. | |
| 2009/0102200 A1 | 4/2009 | Greenspan et al. | |
| 2009/0261593 A1 * | 10/2009 | Culjak | 290/53 |
| 2010/0025993 A1 * | 2/2010 | Raftery | 290/42 |
| 2010/0102562 A1 | 4/2010 | Greenspan et al. | |
| 2011/0304145 A1 | 12/2011 | Raisch | |
| 2012/0112472 A1 | 5/2012 | Murray et al. | |
| 2013/0082465 A1 | 4/2013 | Frich | |
| 2013/0113214 A1 | 5/2013 | Mcgrath | |
| 2013/0127168 A1 | 5/2013 | Dragic | |
| 2013/0134714 A1 | 5/2013 | Daqian | |

FOREIGN PATENT DOCUMENTS

| | | |
|---|---|---|
| FR | 2869368 A1 | 10/2005 |
| GB | 2 062 113 A | 5/1981 |
| JP | 55322934 A | 3/1978 |
| JP | S5322934 A | 3/1978 |
| JP | 03168363 A | 7/1991 |
| JP | 11-6472 A | 1/1999 |
| SE | 532 074 C2 | 10/2009 |
| WO | 03/058054 A1 | 7/2003 |
| WO | 2005/038244 A1 | 4/2005 |
| WO | 20051038244 A1 | 4/2005 |
| WO | 2005/054668 A1 | 6/2005 |
| WO | 20051054668 A1 | 6/2005 |
| WO | 2007/084013 A1 | 7/2007 |
| WO | 20071084013 A1 | 7/2007 |
| WO | 2009/105011 A1 | 8/2009 |
| WO | 2009/129560 A1 | 10/2009 |
| WO | 2010/044674 A2 | 4/2010 |
| WO | 2010/067341 A2 | 6/2010 |

OTHER PUBLICATIONS

International Search Report issued in corresponding International application no. PCT/SE2009/000100, date of mailing May 20, 2009.
Extended European Search Report issued in corresponding European application No. 09 71 1692, date of mailing Mar. 7, 2013.

* cited by examiner

WAVE ENERGY CONVERTER

TECHNICAL FIELD

The present invention relates to a wave energy converter for producing electric energy from movements of water waves, and a method of producing electric energy from more or less intermittent mechanical energy, such as more or less periodical movements of a body.

BACKGROUND ART

Wave energy is a concentrated form of renewable energy that comes from the friction between the water surface and the wind. The energy is built up by the wind on the open seas and then transported to locations closer to the shore, where it can be extracted with wave energy converters. Due to the high energy density of ocean waves, wave power is very area efficient and the average energy content changes more slowly and predictably compared to, for example, the wind. The resources are vast and can be harvested close to populated areas.

However, there are great challenges that must be solved before wave power can be commercially viable. Intermittent and highly fluctuating energy from the ocean waves must efficiently be converted into a steady output of electricity that is suitable for the power grid. Ocean waves have never ceasing variations in height, length, direction and time period (velocity) from wave to wave at a given sea state. A sea state is defined by the significant wave height (Hs) which is calculated from the average of the highest ⅓ of 100 waves in a row. The sea state will change slowly but largely over time; in storm conditions the average energy content in a sea state can be over 100 times higher than during normal conditions (annual average).

In order for a wave energy converter to capture energy efficiently, it should have sufficient length of stroke to follow the highest waves in the maximum wave condition it is designed for and intended to operate in, and it must be able to adjust to or handle changing sea levels and wave directions. Energy capture in a wave energy converter depends of the motion speed and force between an energy capturing device, such as a floating buoy, and a fixed or moving reference. If only one direction of motion can be used, e.g. the vertical motion, the motion speed will change from zero to a top level twice for every wave period. Looking at the vertical motion speed of the water particles in a wave, the motion speed is highest where the water particles pass through the average sea level and zero in crest and trough. In any given sea state the peak energy is found in the highest waves, statistically determined by Hs*1.8. The peak energy captured from the largest waves is in the order of 7-10 times higher compared to the average energy in any given sea state.

Converting the captured energy instantly is not efficient. The power will then fluctuate rapidly from zero up to the peak level which is not suitable from a conventional generator or the power grid to which it delivers the generated power. The generator must be sized to handle the peaks of energy which will lead to low utilization and low electrical efficiency with high heat generation as a consequence. The peak power can be distributed to speed and torque in the generator but neither one can be allowed to exceed a maximum value without damaging the generator. A higher speed will naturally lead to higher torque unless the damping of the generator is dynamically changed to compensate.

However, compensating the damping of the generator to reduce the peak torques will reduce the electrical efficiency even further. For this reason the peak torque/mechanical load will also reach high values as a consequence of the peak power being converted. An alternative is to limit the maximum instantaneous energy capture or spill excessive energy captured but this will reduce the utilization of all other parts of the wave energy converter by reducing the average power output.

To make possible efficient conversion of wave energy to electricity, as much energy as possible must be captured and then smoothed to a steady load on the power takeoff and generator with some kind of power smoothing device. In hydraulic power takeoffs it is common to use gas accumulators, but the gas pressure and thereby the hydraulic pressure in the hydraulic system increases exponentially with the level of energy stored in the accumulator, making it difficult to achieve sufficient power smoothing without very large size of the gas accumulator. To achieve a smooth power output matching the average energy from a given sea state, the capacity must be sufficient to smooth energy over several waves in a row. Two or three large waves may occur in a row after which number of smaller waves may occur. It is often said that every seventh wave is a large one and as said above, 100 waves in a row is measured to determine a sea state.

Wave power technologies have been developed for a long period of time but up to now it has not been shown how to design a wave energy converter that is able to efficiently convert the intermittent and highly fluctuating energy form ocean waves into a steady power output, as described above.

A frequent method of capturing the energy of water waves is to use the vertical movement of the water. Installations that use such technology are sometimes called "point absorbers". One method of using the vertical movements comprises the use of a buoy having a bottom foundation and an anchor wheel. The bottom foundation is firmly positioned on the sea-floor and is connected to the buoy which follows the ocean surface, i.e. the wave movements. When the surface rises and thereby lifts the buoy, a motive force is created which is converted into a rotational movement by a driving bar connected between the foundation and the buoy or by a wire or chain which runs over an anchor wheel journalled for rotation at the buoy or in the foundation and which is at an opposite end connected to the foundation or the buoy, respectively. The motive force increases due to the increased motion speed of the waves when the wave height becomes higher. The rotation direction and speed of an anchor wheel, if such a wheel is used, is directly dependent on the vertical direction and motion speed of the waves. However, this is not optimal for coupling a conventional generator to the anchor wheel to produce electric energy.

In order to make a wave energy converter driving a conventional rotating generator efficient, the vertical movements of the waves must be converted into a unidirectional rotational movement, and the rotation speed of an electric generator connected to the transmission must be stabilized. In a device, as described above, using a driving bar, wire or chain, which is secured to the bottom of the sea or in a frame structure and which runs along or over an anchor wheel journalled in a buoy, this problem can partly be solved in the following way. When the buoy is lifted by a wave, a motive force over the anchor wheel is produced. Thereupon, when the wave falls, an anti-reverse mechanism is disengaged and the anchor wheel is rotated backwards by a counterweight. Then, the motive driving is only active during the rise of the wave and completely ceases when the wave sinks, this not being satisfactory.

Attempts have been made to reverse the rotation direction, so that an electric generator driven by the anchor wheel is driven by the counterweight in the same direction also when the wave sinks. It has also been attempted to reverse the rotation direction of the generator. However, changing the rotation direction of a mechanical transmission or of the generator twice in every wave period results in mechanical wear. Even though the rotation direction can be made unidirectional by the transmission, the rotation speed follows the speed of the vertical movement, this causing the speed and torque of the generator to vary according to the speed of the wave movements. This gives high fluctuations in the power output and torque load in the system and as a consequence also low efficiency and utilization of the generator since the generator has to be oversized to handle the peak loads. The power takeoff must also be oversized to handle the peak torques.

In order to make the motive force and rotation speed of a generator more even when using a mechanical transmission, multiple buoys can cooperate with each other, a phase shift then existing between the movements of the buoys. However, this only works optimally in the case where the buoys are evenly distributed over a wave period, which very seldom occurs since the length and the speed of the waves always vary.

Some of the basic disadvantages of the wave energy converters having the structure described above are eliminated or at least significantly reduced in the wave energy converters disclosed in the published International Patent Application No. WO 2009/105011. In such wave energy converters energy from water waves is in the common way, during parts of the movements of the water waves, absorbed for driving an electric generator. Part of the absorbed energy is temporarily accumulated or stored in some suitable mechanical way for driving the electric generator during other parts of the movements of the water waves. The driveshaft coupling of the movement of the water level and the mechanical energy storage to the electric generator is in a special mechanical way arranged for a unidirectional rotation with a constant torque and a constant rotation speed.

SUMMARY OF INVENTION

An object of the present invention is to provide an efficient power takeoff for a wave energy converter wherein the drawbacks of prior art solutions are eliminated or at least minimized.

According to a first aspect of the present invention, a wave energy converter is provided comprising an energy absorption unit arranged to absorb energy generated by movements of water when the wave energy converter is arranged in a pool of water, an energy accumulation unit (200) connected to the energy absorption unit, and a power generation unit connected to the energy absorption unit, wherein the energy absorption unit, the energy accumulation unit, and the power generation unit are arranged in a floating body, wherein the energy accumulation unit is arranged to accumulate energy from the energy absorption unit when the energy absorption unit absorbs more energy than the power generation unit generates and to dissipate energy to the power generation unit when the energy absorption unit absorbs less energy than the power generation unit generates, characterised in that the energy absorption unit comprises a hydraulic pump connected to means for converting vertical motion into a rotational motion, the energy accumulation unit comprises a first combined hydraulic pump and motor operably connected to counterweight for converting vertical motion into a rotational motion, and the power generation unit comprises a hydraulic motor connected to an electric generator.

A hydraulic power takeoff system is believed to be more robust and allows a more flexible and controllable design, although the efficiency of a hydraulic power takeoff is much lower compared to a mechanical power takeoff due to much higher friction caused by the hydraulic flow through the system.

By arranging the energy absorption unit, the energy accumulation unit, and the power generation unit in a floating body, the wave energy converter is easy to install and retract and that the above mentioned units are easy to access for maintenance.

In a preferred embodiment, a preferably oblong means arranged for converting vertical motion into a rotational motion is connected to the input shaft of a hydraulic pump, whereby the movement of the wave energy converter is efficiently translated into a rotational force driving the hydraulic pump. It is preferred that the shaft of a return feeding device, preferably a combined hydraulic pump and motor, is mechanically connected to the means for converting vertical motion into a rotational motion, whereby the return feeding device is used to rewind the shaft attached to the means in order to keep the oblong means stretched during return feeding when the wave energy converter moves closer to the other end of the means which is attached to a more or less fixed point of reference. It is required that the means is in a stretched state in order to generate a rotational force for driving the hydraulic pump when the wave energy converter moves away from the said more or less fixed point of reference.

Further preferred embodiments are defined by the dependent claims.

BRIEF DESCRIPTION OF DRAWINGS

The invention is now described, by way of example, with reference to the accompanying drawings, in which.

DESCRIPTION OF EMBODIMENTS

In the following, a detailed description of various embodiments of a wave energy converter will be given. In this description, the term "pool of water" should be taken to include any body or mass of water.

Figure 1:
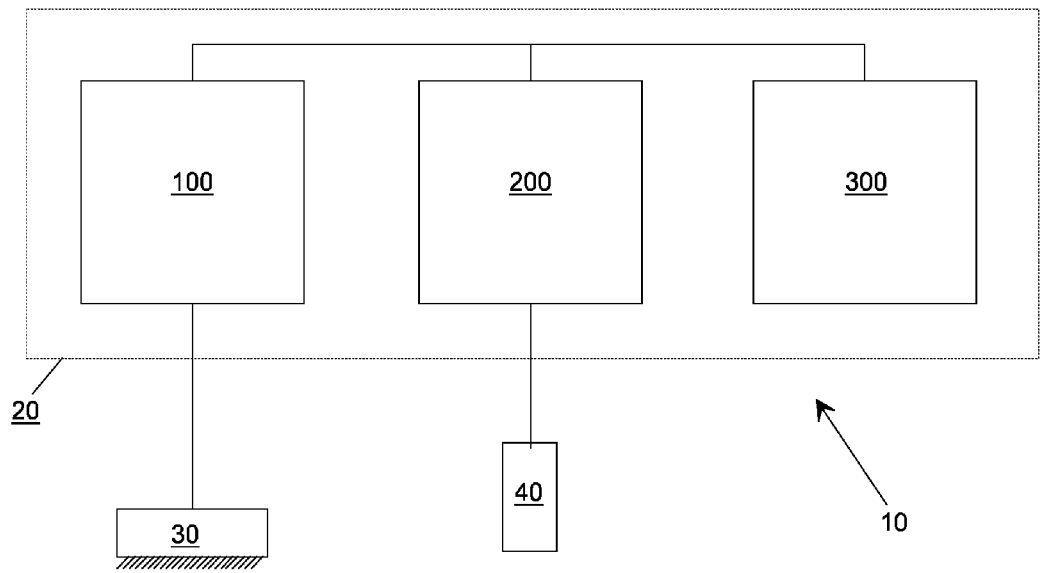
FIG. 1 is a block diagram showing the overall layout of a hydraulic power takeoff in a wave energy converter according to the invention.

Referring to FIG. 1, a wave energy converter according to the invention comprises an energy absorption unit 100, an energy accumulation unit 200 connected to the energy absorption unit 100, and a power generation unit 300 connected to the energy absorption unit 100. These units are preferably arranged in a buoy or floating body 20.

The energy absorption unit 100 is arranged to absorb energy generated by movements of water when the wave energy converter is arranged in a pool of water. This can be achieved for example by an arrangement connecting the energy absorption unit to the seabed, for example a foundation 30, such as a bottom foundation, as will be explained in detail below. In the upward and downward movements of the water surface the buoy 20 is made to alternately rise or sink and/or alternately rock or tilt back and forth. Thereby a motive force can be created in relation to the bottom of the pool of water.

The energy accumulation unit 200 is arranged to accumulate energy from the energy absorption unit 100 when the energy absorption unit absorbs more power than the power generation unit 300 generates and to dissipate energy to the power generation unit 300 when the energy absorption unit absorbs less power than the power generation unit 300 generates. The accumulated energy is stored as potential energy in a counterweight 40, which provides a nearly constant torque that only changing slightly due to inertia effects in moving and rotating parts of the system. In this way, the power output of the wave energy converter can be maintained essentially constant, despite varying wave energy levels.

Figure 2:
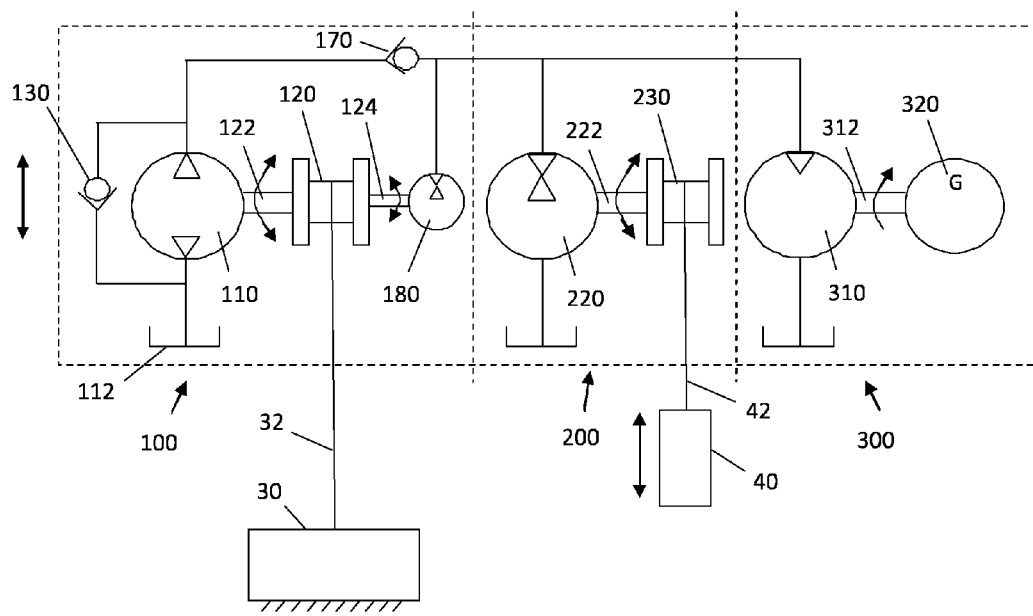
FIG. 2 is a detailed diagram showing the components of the hydraulic power takeoff in a wave energy converter of FIG. 1 according to a first embodiment operating with a single drive system.

Common to the energy absorption unit 100, the energy accumulation unit 200, and the power generation unit 300 is that they comprise hydraulic components, such as hydraulic pumps/motors, hydraulic backstop valves, conduits for hydraulic fluid etc. This is shown in FIG. 2, which is a more detailed diagram of the hydraulic power takeoff in a wave energy converter shown in FIG. 1. Thus, the energy absorption unit 100 comprises a hydraulic pump 110, in this case a bidirectional pump, which is connected to a means for converting vertical motion into a rotational motion. In this embodiment, this means is an anchor drum 120 via an interconnecting first anchor drum shaft 122. The anchor drum 120 is also provided with a second anchor drum shaft 124.

The anchor drum 120 is, during operation, connected to a bottom foundation 30 by means of an anchor line 32, e.g. a steel wire. As an alternative, the motive force can be created in relation to some kind of movable object such as to a weight suspended in the anchor drum 120.

The hydraulic fluid described herein is preferably hydraulic oil.

The hydraulic pump 110 is connected in parallel by means of hydraulic conduits to a first hydraulic one-way or backstop valve 130. This first backstop valve is arranged to enable free-wheeling of hydraulic fluid in a clockwise direction as seen in the figure through the hydraulic pump 110 and the first one-way valve 130.

The input of a second hydraulic backstop valve 170 of the accumulation unit 200 is connected to the hydraulic pump 110 and the output of the first backstop valve 130 of the absorption unit 100 by means of a hydraulic conduit. The output of the second backstop valve 170 is connected to a first combined hydraulic pump/motor 220 and to a return feeding device in the form of a second combined hydraulic pump/motor 180. The first pump/motor 220 comprises a shaft 222, which is connected to a counterweight drum 230. This in turn is connected to a counterweight 40 suspended in the counterweight drum 230 by means of a counterweight line 42, such as a steel wire.

The second hydraulic pump/motor 180 is mechanically connected to the second anchor drum shaft 124 in order to operate as a return feeding motor. To this end, the second hydraulic pump/motor has lower displacement compared to the hydraulic pump 110. This allows a fraction of the absorbed energy to be used for return feeding of the anchor drum 120. The displacement of the second hydraulic pump/motor 180 is substantially lower compared to the displacement of the hydraulic pump 110, and typically in the order of ten times lower compared to the displacement of the hydraulic pump 110.

The output of the second backstop valve 170, the first hydraulic motor/pump 220 and the second hydraulic motor/pump 180 are also connected to the power generation unit 300 and more specifically to the input of a hydraulic motor 310. This hydraulic motor 310 is provided with an outgoing shaft 312 operably connected or connectable to an electric generator 320, the outputs of which are connected to a power grid (not shown).

The operation of the wave energy converter of FIG. 2 will now be explained in detail. In the up going motion of the wave, hydraulic fluid flows through the hydraulic pump 110 in one direction. The first hydraulic backstop valve 130 blocks the flow to the hydraulic fluid reservoir. The second hydraulic backstop valve 170 allows hydraulic fluid to go into the power takeoff towards the next part of the hydraulic system comprised in the accumulation unit 200 and the power generation unit 300. When the wave goes down the flow direction in the hydraulic pump 110 is reversed and the first hydraulic backstop valve 130 and the second hydraulic backstop valve 170 change state, allowing the hydraulic fluid to be circulated from the output to the input of the hydraulic pump 110 while the second hydraulic backstop valve 170 blocks the hydraulic fluid from flowing back into the hydraulic system of the absorption unit 100, thereby conserving absorbed energy in the system.

There exists a state of equilibrium between the counteracting torque in the generator 320 and the motive torque of the counterweight 40, creating a steady pressure and flow through the hydraulic motor 310 in the power generation unit 300. When the flow from the energy absorption unit 100 is higher than the flow through the hydraulic motor 310, the excessive flow goes through pump/motor 220 connected to the counterweight drum 230 in the accumulation unit 200, acting as a motor and drives the counterweight drum 230 in a direction that lifts the counterweight 40, thereby storing excess energy. When the flow from the energy absorption unit 100 is lower than the flow through the hydraulic motor 310 in the power generation unit 300, the counterweight drum 230 instead drives the first hydraulic pump/motor 220 as a pump, and thus pressure and flow through the hydraulic motor 310 in the power generation unit 300 is maintained on a smooth level through the full wave cycle, thus driving the generator 320 to produce a smooth power output through the full wave cycle.

When the water wave sinks, the anchor drum is reversed by the second hydraulic motor/pump 180 acting as a motor in order to keep the anchor wire tensed. In the up going wave motion, the second hydraulic motor/pump 180 acts as a pump, adding flow to the high pressure side of the system.

As an alternative to providing return feeding of the anchor drum 120 with the second hydraulic pump/motor, return feeding can be implemented with any type of elastic force, such as a spring, electrical motor, weight etc.

In the embodiment of the wave energy converter described above with reference to FIG. 2, wave energy is only absorbed in one direction of the vertical wave direction, i.e., a wire is attached to the sea bed and can only drive the power takeoff in up going wave motion. In an alternative embodiment, shown in FIG. 3, the wave energy converter is divided into two parts: one part following the wave motion and one part counteracting the wave motion. The relative movement between these two parts can be used to drive the power takeoff in both vertical directions, creating a double drive of the system. The advantage with double drive is that the average input speed from the anchor drum is doubled which means that torque and pressure is reduced to half in relation to the power output. Torque/pressure is a major cost driver for the power takeoff, a reduction of torque can therefore lead to cost savings.

This second embodiment is in most aspects identical to the first embodiment described above with reference to FIG. 2. Thus, the energy absorption unit 100 comprises a hydraulic pump 110, which is connected to an anchor drum 120 via an interconnecting first anchor drum shaft 122. However, the anchor drum 120 need not be provided with a second anchor drum shaft, as in the above explained embodiment.

The anchor drum 120 is, during operation, connected to a bottom foundation 30a by means of an anchor line 32, e.g. a steel wire or rope. Through the same anchor line 32, the anchor drum 120 is also connected to an upper foundation 30b, which is fixed at a predetermined distance from the bottom foundation 30a. Upper foundation 30b and bottom foundation 30a can be comprised in the same structure or in separate structures.

Alternatively, the absorption unit 100, the accumulation unit 200, and the power generation unit 300 are provided at a fixed level and the bottom foundation 30a and the upper foundation 30b are provided as buoys following the vertical movements of the water at an essentially constant mutual distance.

In this embodiment, the hydraulic motor/pump used for return feeding is no longer needed since the anchor line 32 is tensed. Instead of a hydraulic backstop valve and a return feeding device, a valve bridge 140 comprising four backstop valves is provided parallel to the hydraulic pump 110. This means that a hydraulic absorption unit 100 delivers pressure and hydraulic flow to the accumulation unit 200 and the power generation unit 300, irrespective of the direction of rotation of the hydraulic pump/motor 110, i.e. both when the waves are rising and when they are sinking.

As a consequence of this, no backstop valve is needed in the connection to the accumulation unit 200. Thus, this accumulation unit 200 comprises a first hydraulic pump/motor 220 with a shaft 222, which is connected to a counterweight drum 230. This in turn is connected to a counterweight 40 suspended in the counterweight drum 230 by means of a counterweight line 42, such as a steel wire or rope.

The output end of the valve bridge 140 and the hydraulic motor/pump 220 are connected to the input of a hydraulic motor 310. This hydraulic motor 310 is provided with an outgoing shaft 312 operably connected to an electric generator 320, the outputs of which are connected to a power grid (not shown).

Figure 3:
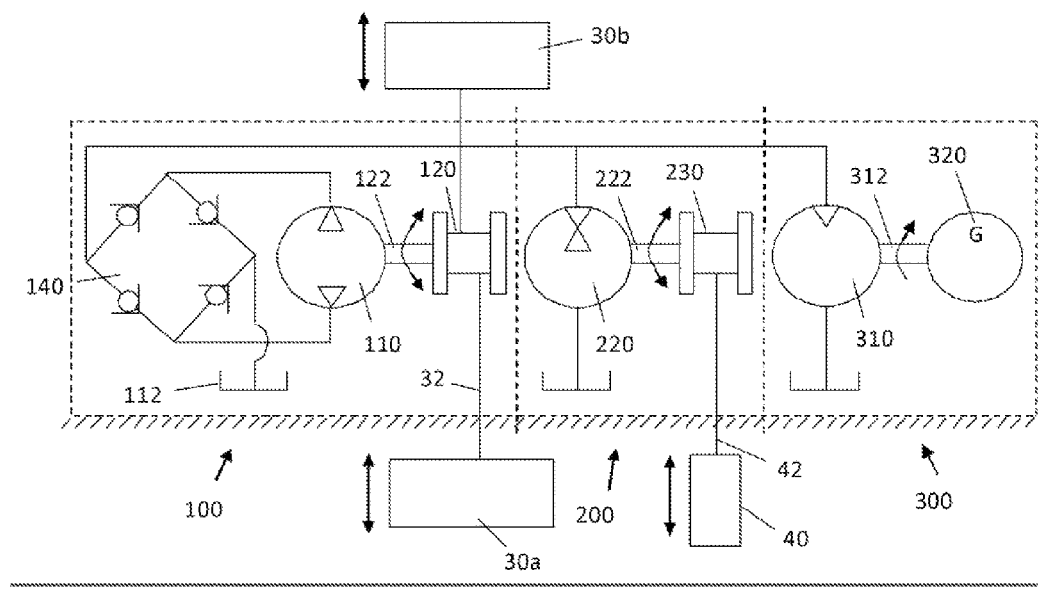
FIG. 3 is a detailed diagram showing the components of the hydraulic power takeoff in a wave energy converter of FIG. 1 according to a second embodiment operating with a double drive system.

The operation of the wave energy converter shown in FIG. 3 is essentially the same as the operation of the wave energy converter of FIG. 2. Power is absorbed by the hydraulic pump 110 and this power is stored in the counterweight 40 or converted to electrical energy through the hydraulic motor 310 and the electric generator 320.

In order to disengage energy absorption in the wave energy converter, a 3/2-way valve 150, also called bypass valve, can redirect the flow generated by the anchor pump directly back to the hydraulic fluid reservoar.

A wave energy converter with the possibility of disengagement of incoming energy will now be described with reference to FIG. 4. This converter is identical to the wave energy converter described above with reference to FIG. 2 with the addition that a bypass valve 150 is located on the absorption unit side to the second hydraulic backstop valve 170 preventing hydraulic fluid from flowing back from the accumulation unit 200 and to the absorption unit 100. When the wave energy converter is in return feeding, the pressure is very low in the absorption unit. The 3/2-way valve can therefore be operated during low pressure conditions to minimize wear and heat generation.

The 3/2-way valve can also be combined with pressure limitation or a pressure reduction function that limits the maximum pressure in the system. This can prevent damage if the system locks up or if the weather conditions causes too high mass moment of inertia in the system. This is equivalent to a mechanical clutch with limited torque transfer.

Figure 5:
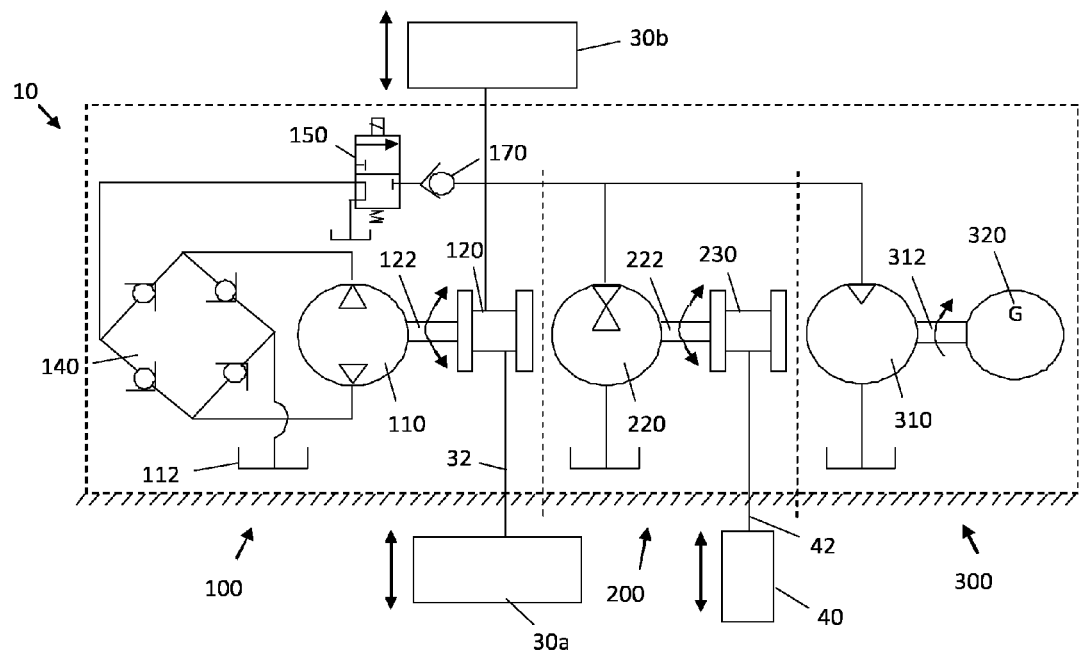
FIG. 5 is a detailed diagram showing the components of the hydraulic power takeoff in a wave energy converter of FIG. 3 with disengagement of incoming energy.

The same type of 3/2-way valve can be used in the double drive system of FIG. 3 which is then also complemented with a back stop valve 210 in order to prevent stored energy to escape through the 3/2-way valve when it is in bypass mode. Thus, a double drive wave energy converter with the possibility of disengagement of incoming energy will now be described with reference to FIG. 5. This converter is identical to the converter described above with reference to FIG. 3 with the addition that a bypass valve 150 and a back stop valve 210 is located in the absorption unit side between the output of the valve bridge 140 and the accumulation unit 200.

In order to hold the counterweight when the generator is not in operation, a hydraulic brake is required. In a hydraulic system, a 2/2-way valve that can block the flow to the generator is provided. 2/2-way valves can be used also to block the flow from each drum in the system, to be used as service brakes. In other words, to enable release of pressure in the main part of the hydraulic system during service and maintenance. To completely release pressure for the whole system, the counterweight must be secured to the buoy or a service vessel or lowered down to the sea floor.

Figure 6:
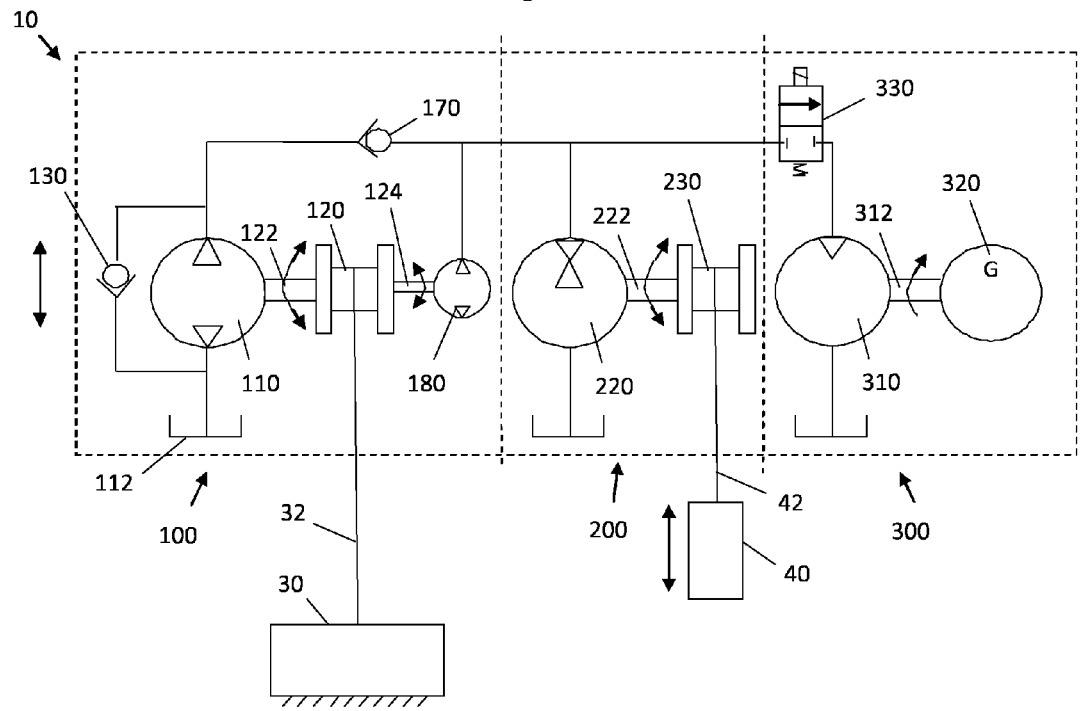
FIG. 6 is a detailed diagram showing the components of the hydraulic power takeoff in a wave energy converter of FIG. 2 but also provided with a brake system.
Figure 7:
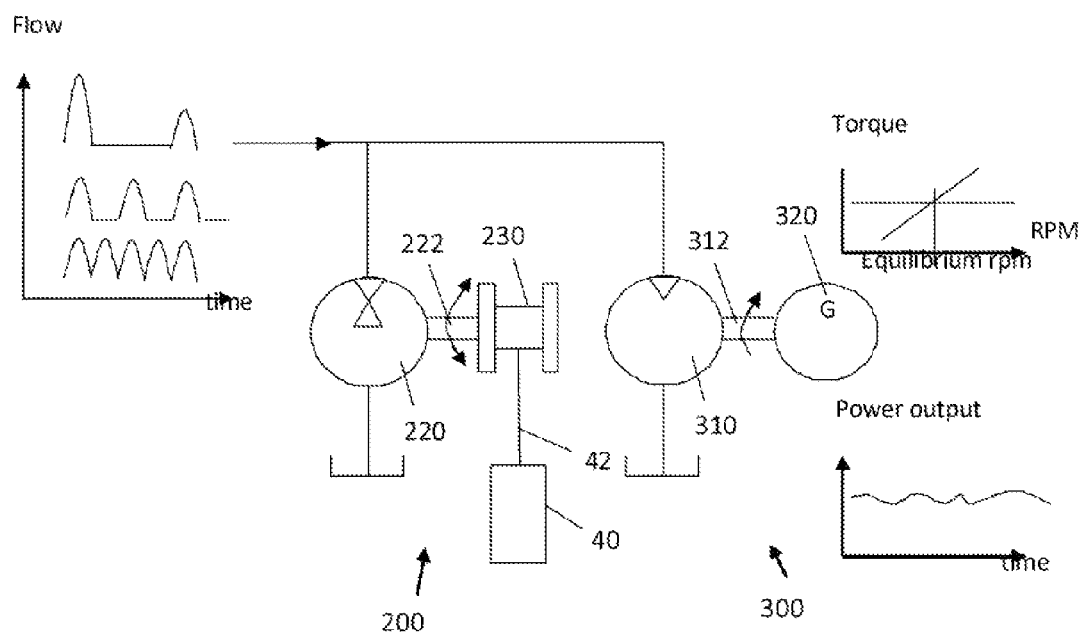
FIG. 7 shows essentially constant torque operation of an accumulation unit comprised in a hydraulic power takeoff in a wave energy converter according to the invention.

A wave energy converter with the possibility of braking will now be described with reference to FIG. 6. This converter is identical to the converter described above with reference to FIG. 2 with the addition that a 2/2 valve 330 is located connected to the input of the hydraulic motor 310.

As an alternative to a drum for the counterweight, a wheel for a chain or toothed bar or any other means to convert the vertical motion between the two bodies into a rotational motion, can of course be used.

In the wave energy converter described herein, the counterweight is used as a constant torque accumulator and the power output from the system is controlled by the state of equilibrium between the motive torque of the counterweight and the counteracting torque of the electric generator. The counteracting torque in an electric generator depends on the speed or phase difference and the magnetic coupling between rotor and stator. With a fixed damping coefficient in the generator, the speed will increase or decrease until the counteracting generator torque matches the motive torque from the counterweight where the speed is stabilized and thereby also the power output. Control of the damping coefficient can in this way be used to control the speed of the generator and thereby the power output, independently of the absorbed energy and with a torque load in the system only changing slightly due to mass moment of inertia in the system. Different electric generators have different techniques to control the damping coefficient but it can be controlled for all types of generators, for example by adjusting field current, different speeds of anchor and rotor or different phases of anchor and rotor.

When momentarily more energy is absorbed in the system compared to the electric generator output power, excess energy is stored in the counterweight as potential energy, i.e. the counterweight is lifted. When momentarily less energy is absorbed in the system compared to the generator output, stored energy in the counterweight is used to create a continuous drive of the generator. The power output is stable through the full wave cycle, independently of the intermittent and highly fluctuating input power from the waves. The counterweight will move up and down to compensate for the fluctuations in the wave spectrum.

When for a period of time more energy is absorbed than generated in the system, the counterweight will move in an upward trend and vice versa. However, the power output is controlled to match the average level of incoming energy over a suitable time frame by tuning the damping coefficient in the generator so that the output power from the generator matches the average level of input power from the waves. This enables the average position of the counterweight to be maintained while providing a stable power output that matches the current wave situation, often defined by the significant wave height or Hs.

The hydraulic motors/pumps used in the energy absorption unit 100, energy accumulation unit 200 and power generation unit 300 can comprise variable displacement in order to enable additional tuning capabilities of the power takeoff.

Figure 4:
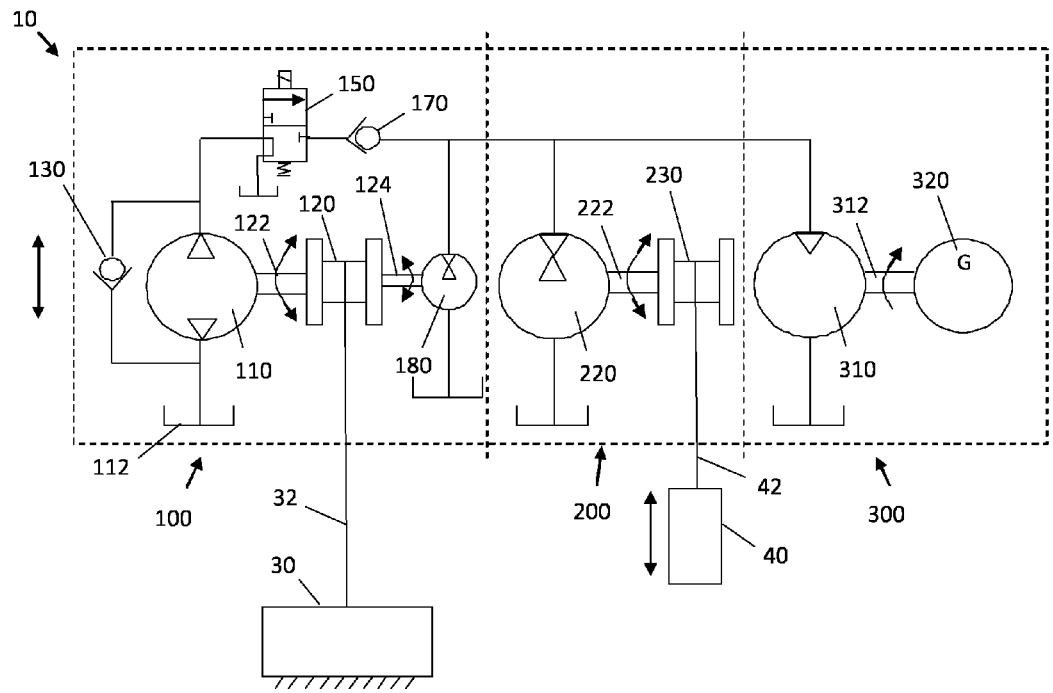
FIG. 4 is a detailed diagram showing the components of the hydraulic power takeoff in a wave energy converter of FIG. 2 with disengagement of incoming energy.

Instead of dissengaging energy absorption completely with a bypass valve 150 shown in FIG. 4, the energy capture can instead be reduced by lowering the displacement in the hydraulic motor/pump 110 in the energy absorption unit 100.

The displacement in the hydraulic motor/pump 110 can also be used for changing the damping effect that the power takeoff has on the buoy. Tuning of the damping in the power takeoff can be used to optimize energy capture for different sea states, e.g. optimizing the heave response of the buoy. For a certain wave frequency, the optimal combination of displacement and damping gives the highest hydraulic flow into the power takeoff, and thereby the highest energy capture. Too high or too low damping reduces the heave response of the buoy. This is some times referenced to as tuning the power takeoff to find the resonance to the wave frequency.

A variable displacement in the hydraulic motor/pump 220 in the energy accumulation unit 200 can be used to reduce the movement speed of the counterweight in rough sea conditions, to reduce the peak loads caused by inertia in the counterweight 40. Tuning displacement in the hydraulic motor/pump 220 also changes the hydraulic pressure given by the counterweight, which in turn also has an impact on the damping effect that the power takeoff has on the buoy.

A variable displacement in the hydraulic motor 310 in the power generation unit 300 can be used for tuning the torque/rpm of the generator, to take as high values as possibly without the risk of overloading the generator due to fluctuations caused by inertia effect in moving and rotating parts of the system. Tuning the torque in the generator can improve generator efficiency and maximum power output possible without overloading the generator.

The power takeoff described herein can be implemented in many different types of wave energy converter systems. The input flow can be generated from a hydraulic pump as shown in FIGS. 2 and 3, a hydraulic cylinder or any other means of creating a hydraulic flow into the power takeoff.

The power takeoff can be located inside a buoy that follows the water movements at the surface. The power takeoff can also be located below, at or above the water surface in a structure, typically the structure is fixed to the seafloor, to a heave plate or to a large mass body, arranged to counteract the movements of any kind of device that uses wave motion to create movements in relation to the counteracting structure, typically a buoy, submerged body or a plate.

The main advantage with the described power takeoff with power smoothing capabilities is a stable mechanical and electrical load in the system, with very low peak torque/pressure in the power takeoff and peak power in the generator compared to other power takeoffs. The system also reduces the working range for the generator which leads to higher efficiency and utilization of the power electronics, and less heat generation. Other advantages are that the system can limit energy absorption while maintaining rated power by temporary disengaging from incoming energy and that the system can be put to a complete stop, which is not possible with other counterweight technologies without stopping the motion of the buoy.

Preferred embodiments of a wave energy converter have been described. It will be appreciated that these can be varied within the scope of the appended claims without departing from the inventive idea.

Although the electric generator has been described as provided on the floating body, it is appreciated that it can be provided at a distance from the wave energy converter itself, such as at the sea bed or at shore.

The invention claimed is:

1. A wave energy converter comprising:
   an energy absorption unit arranged to absorb energy generated by movements of water when the wave energy converter is arranged in a pool of water,
   an energy accumulation unit connected to the energy absorption unit, and
   a power generation unit connected to the energy absorption unit,
   wherein the energy absorption unit, the energy accumulation unit, and the power generation unit are arranged in a floating body,
   wherein the energy accumulation unit is arranged to accumulate energy from the energy absorption unit when the energy absorption unit absorbs more energy than the power generation unit generates and to dissipate energy to the power generation unit when the energy absorption unit absorbs less energy than the power generation unit generates, wherein:
   the energy absorption unit comprises a hydraulic pump connected to means for converting vertical motion into a rotational motion, the energy accumulation unit comprises a first combined hydraulic pump and motor operably connected to counterweight for converting vertical motion into a rotational motion, and the power generation unit comprises a hydraulic motor connectable to an electric generator.

2. The wave energy converter according to claim 1, wherein the hydraulic pump is a bidirectional hydraulic pump.

3. The wave energy converter according to claim 1, wherein the means for converting vertical motion into a rotational motion is connectable to a foundation.

4. The wave energy converter according to claim 1, wherein the means for converting vertical motion into a rotational motion is a drum.

5. The wave energy converter according to claim 4, wherein the drum is, during operation, connected to a bottom foundation and also to an upper foundation, which is fixed at a predetermined distance from the bottom foundation.

6. The wave energy converter according to claim 1, comprising a return feeding device mechanically connected to the means for converting vertical motion into a rotational motion.

7. The wave energy converter according to claim 6, wherein the return feeding device is a second combined hydraulic pump and motor hydraulically connected to the first combined hydraulic pump and motor.

8. The wave energy converter according to claim 7, wherein the displacement of the second hydraulic pump/motor is substantially lower compared to the displacement of the hydraulic pump.

9. The wave energy converter according to claim 1, comprising a first backstop valve connected in parallel with the hydraulic pump.

10. The wave energy converter according to claim 1, comprising a second backstop valve, the input of which is connected to the hydraulic pump and the output of which is connected to the first combined hydraulic pump and motor.

11. The wave energy converter according to claim 10, comprising a 3/2 valve located on the absorption unit side to the second hydraulic backstop valve preventing hydraulic fluid from flowing back from the accumulation unit and to the absorption unit.

12. The wave energy converter according to claim 1, comprising a valve bridge provided parallel to the hydraulic pump.

13. The wave energy converter according to claim 1, comprising a 2/2 valve connected to the input of the hydraulic motor.

14. The wave energy converter according to claim 1, wherein at least one of the hydraulic pump, the first combined hydraulic pump and motor, and the hydraulic motor has variable displacement.

* * * * *